(12) United States Patent
Egara

(10) Patent No.: US 6,233,955 B1
(45) Date of Patent: May 22, 2001

(54) ISOTHERMAL COOLANT CIRCULATING APPARATUS

(75) Inventor: Yoshitaka Egara, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/433,721

(22) Filed: Nov. 4, 1999

(30) Foreign Application Priority Data

Nov. 27, 1998 (JP) .................................................. 10-337360

(51) Int. Cl.⁷ .................................................. F25D 17/02
(52) U.S. Cl. ................................. 62/196.4; 62/185; 62/201
(58) Field of Search .................................... 62/196.4, 185, 62/197, 201, 117

(56) References Cited

U.S. PATENT DOCUMENTS

| | | | |
|---|---|---|---|
| 3,555,843 | 1/1971 | Cook | 62/196 |
| 3,791,160 | * 2/1974 | Savitz et al. | 62/196 |
| 3,933,004 | * 1/1976 | Carter | 62/199 |
| 4,000,626 | * 1/1977 | Webber | 62/175 |
| 4,240,266 | * 12/1980 | Scrine et al. | 62/196 B |
| 4,471,631 | 9/1984 | Anstey et al. | 62/177 |
| 4,769,998 | * 9/1988 | Oswalt et al. | 62/98 |
| 4,850,201 | * 7/1989 | Oswalt et al. | 62/185 |
| 5,076,068 | 12/1991 | Mikhail | 62/215 |

FOREIGN PATENT DOCUMENTS

| | | |
|---|---|---|
| 0 892 229 | 1/1999 | (EP) . |
| 0 892 231 | 1/1999 | (EP) . |
| 2 242 332 | 9/1991 | (GB) . |

* cited by examiner

Primary Examiner—Harry B. Tanner
(74) Attorney, Agent, or Firm—Oblon, Spivak, McClelland, Maier & Neustadt, P.C.

(57) ABSTRACT

An isothermal coolant circulating apparatus being energy-saving and capable of reducing the cost of operation and equipment is provided. A refrigerating circuit section 52 comprises a hot gas circuit 58 for mixing high-temperature refrigerant discharged from a compressor 7 with low-temperature refrigerant being supplied to an evaporator 10 via an electronic expansion valve 56, and an electronic expansion valve 59 in the hot gas circuit 58. Coolant returned from a load 2 to a coolant circuit section 53 is cooled in a heat exchanger 25 incorporated by the evaporator 10 thereinto and then mixed with coolant returned from the load 2 in an electric-motor-operated three-way valve 65 to be a predetermined temperature. The electronic expansion valves 56 and 59 are controlled by an expansion valve controller 69 in a controlling section 54, while the electric-motor-operated three-way valve 65 is controlled by a temperature controller 68 therein.

2 Claims, 5 Drawing Sheets

ISOTHERMAL COOLANT CIRCULATING APPARATUS

INDUSTRIAL FIELD OF THE INVENTION

The present invention relates to an isothermal coolant circulating apparatus for supplying and circulating isothermal coolant to a load.

DESCRIPTION OF THE RELATED ART

FIG. 5 shows an example of conventional isothermal coolant circulating apparatuses. This constant-temperature coolant circulating apparatus 1 comprises a refrigerating circuit section 3 for cooling a coolant raised in temperature by a load 2, a coolant circuit section 4 for supplying and circulating coolant cooled by refrigerant in the refrigerating circuit section 3 to the load 2 after adjusting it to a predetermined temperature, and a controlling section 5 for controlling the temperature of coolant for supplying to the load 2.

The above-mentioned refrigerating circuit section 3 is formed of a compressor 7 for compressing an appropriate refrigerant to be high-temperature-and-pressure refrigerant gas, a condenser 8 for cooling and condensing the refrigerant gas to be high pressure refrigerant liquid, a pressure-reducing unit 9 for reducing pressure of the refrigerant liquid to reduce the temperature thereof, and an evaporator 10 for evaporating the refrigerant liquid reduced in pressure by the pressure reducing unit 9, these being sequentially connected to each other in series. The pressure-reducing unit 9 controls the pressure of refrigerant in the lower course thereof.

The above-mentioned refrigerating circuit section 3 further comprises a return-current circuit 12 for returning refrigerant liquid condensed in the condenser 8 from the outlet of the condenser 8 to the inlet of the compressor 7 when the temperature of refrigerant in the outlet of the evaporator 10 is high, and a thermostatic expansion valve 13 disposed in the return-current circuit 12. The thermostatic expansion valve 13 is controlled by a temperature sensor 14 for detecting the temperature of refrigerant being returned to the compressor 7 to produce signals. The refrigerating circuit section 3 also includes an overheat-preventing circuit 15 for preventing overheat of the compressor 7, disposed in the upper course of the thermostatic expansion valve 13 in the return-current circuit 12. The overheat preventing circuit 15 is formed of an injection valve 16 and a capillary tube 17, these being arranged in series.

The coolant circuit section 4 comprises a coolant tank 24, a heat exchanger 25 for cooling coolant raised in temperature by the load 2, a heater unit 26 having a heater 27 for heating coolant cooled by the heat exchanger 25, a pump 28 for supplying and circulating coolant adjusted to a predetermined temperature in the tank 24 to the load 2, and a level switch 29 for detecting the coolant level in the tank 24. The heat exchanger 25, the heater unit 26, and the pump 28 are all assembled to within the tank 24. In the outer periphery of the heater 27, a cylindrical-shaped heater cover 30 with the top thereof opened and having a bottom is disposed surrounding the heater 27.

The above-mentioned heat exchanger 25 incorporated thereinto by the evaporator 10 in the refrigerating circuit section 3 is connected to a return pipe 32 of coolant returning from the load 2 at its inlet and the outlet thereof is connected to a pipe 33 communicating with the bottom portion of the heater cover 30.

In a supplying pipe 36 connected to the delivery opening of the pump 28, a temperature sensor 37 for detecting the temperature of coolant flowing within the pipe is disposed, and a pressure gauge 38 for detecting the coolant pressure in the delivery side and a low-pressure cut-out switch 39 for producing signals when the pressure detected by the pressure gauge 38 decreases below a predetermined pressure are disposed downstream of the temperature sensor 37.

On the bottom wall of the tank 24, a drainpipe 40 for discharging coolant in the tank 24 is disposed.

The above-mentioned controlling section 5 is for controlling the overall apparatus and comprises a temperature controller 42 for producing necessary signals in accordance with the temperature signal from the temperature sensor 37, a programmable logic controller (abbreviated to "PLC" below) 43 for producing necessary signals in accordance with the signals from the level switch29 in the tank 24, the low-pressure cut-out switch 39, and a high-pressure refrigerant cut-out switch 20, an electromagnetic contactor/electromagnetic switch 44 for controlling the operations of the compressor 7 and the pump 28, electrically charging the heater 27, and controlling the injection valve 16 in accordance with respective signals produced by the temperature controller 42 and the "PLC" 43, and an operational display panel 45 for indicating necessary information.

In the coolant circuit section 4, when the coolant raised in temperature by the load 2 flows in the heat exchanger 25 through the return pipe 32, it is cooled by low-temperature refrigerant flowing in the evaporator 10 in the refrigerating circuit section 3 so as to flow into the heater cover 30. Then, the coolant heated to a predetermined temperature by the heater 27 flows into the tank 24 from the top opening of the heater cover 30. This coolant is supplied to the load 2 by the pump 28 for cooling it.

Since the above-described isothermal coolant circulating apparatus 1 cools coolant raised in temperature by the load 2 by means of the heat exchanger 25 and heats this coolant to a predetermined temperature by the heater 27, the adjustment of the coolant temperature is easy.

However, since the isothermal coolant circulating apparatus 1 heats the coolant cooled in the heat exchanger 25 by means of the heater 27, the required electric power for operation is increased. In particular, the compressor 7, the pump 28, and the heater 27 may be simultaneously electrically charged according to the operational conditions, such that the allowable capacity of electrical charging the circulating apparatus 1 necessary for operation is required to be increased in order to cope with the situation, resulting in increase of the cost of equipment for electrical charging,

DISCLOSURE OF THE INVENTION

It is a problem to be solved by the present invention to provide an isothermal coolant circulating apparatus offering energy-saving and enabling the cost of operation and equipment to be reduced.

In order to solve the above-mentioned problem, in accordance with one aspect of the present invention, there is provided an isothermal coolant circulating apparatus comprising a coolant circuit section for cooling coolant returned from a load to a predetermined temperature and for supplying the coolant to the load, and a refrigerating circuit section for cooling the coolant, wherein the refrigerating circuit section comprises a hot gas circuit for adjusting the cooling capacity of refrigerant for supplying to an evaporator by mixing low-temperature refrigerant for supplying to the evaporator with a portion of high-temperature refrigerant discharged from a compressor, and wherein the coolant circuit section comprises a heat exchanger for cooling coolant returned from the load to a predetermined temperature by means of the evaporator; and circulating means for supplying the coolant to the load to circulate the coolant.

In accordance with another aspect of the present invention, there is provided an isothermal coolant circulating apparatus comprising a coolant circuit section for cooling coolant returned from a load to a predetermined temperature to supply the coolant to the load, a refrigerating circuit section for cooling the coolant, and a controlling section for controlling the temperature of coolant for supplying to the load, wherein the refrigerating circuit section comprises a hot gas circuit for adjusting the cooling capacity of refrigerant for supplying to an evaporator by mixing low-temperature refrigerant for supplying to the evaporator with a portion of high-temperature refrigerant discharged from a compressor; and an isobaric expansion valve for adjusting the circulating rate of refrigerant in the hot gas circuit, wherein the coolant circuit section comprises a coolant tank; a heat exchanger for cooling coolant returned from the load by means of the evaporator; temperature-adjusting means for adjusting coolant to supply to the load to a predetermined temperature by coolant cooled in the heat exchanger and coolant returned from the load; and circulating means for supplying coolant cooled to a predetermined temperature to the load to circulate the coolant, and wherein the controlling section comprises a temperature controller for controlling the temperature-adjusting means.

In the above-described isothermal coolant circulating apparatus, the refrigerating circuit section may further comprise an electronic expansion valve for replacing the isobaric expansion valve, and the controlling section may further comprise an expansion valve controller for controlling the travel of the electronic expansion valve.

In accordance with still another aspect of the present invention, there is provided an isothermal coolant circulating apparatus comprising a coolant circuit section for cooling coolant returned from a load to a predetermined temperature to supply the coolant to the load, a refrigerating circuit section for cooling the coolant, and a controlling section for controlling the temperature of coolant for supplying to the load, wherein the refrigerating circuit section comprises a hot gas circuit for adjusting the cooling capacity of refrigerant for supplying to an evaporator by mixing low-temperature refrigerant for supplying to the evaporator with a portion of high-temperature refrigerant discharged from a compressor; and an electronic expansion valve for adjusting the circulating rate of refrigerant in the hot gas circuit, wherein the coolant circuit section comprises a coolant tank; a heat exchanger for cooling coolant returned from the load to a predetermined temperature by means of the evaporator; and circulating means for supplying the coolant to the load to circulate the coolant, and wherein the controlling section comprises an expansion valve controller for controlling the travel of the electronic expansion valve.

Coolant returned from the load is cooled in the heat exchanger by the refrigerant mixture of low-temperature refrigerant flowing in the evaporator in the refrigerating circuit section and high-temperature refrigerant flowing in the hot gas circuit to be refrigerant at a predetermined temperature for supplying to the load by the pump.

Therefore, since coolant can be cooled to a predetermined temperature in the heat exchanger without heating by the heater as in a conventional isothermal coolant circulating apparatus, the heater for heating coolant is not required, so that the required electric power for operation is reduced to achieve energy saving, resulting in reducing the cost of operation and equipment. The capacity of the tank in the coolant circulating circuit can be reduced, so that the circulating apparatus can be miniaturized.

More specifically, the refrigerant circuit comprises the electronic expansion valve for adjusting the amount of refrigerant circulation in the hot gas circuit; the coolant circulating circuit comprises temperature adjusting means for adjusting coolant to a predetermined temperature by mixing coolant cooled in the heat exchanger with coolant returned from the load; and the controlling section comprises the expansion valve controller for controlling the travel of the electronic expansion valve and the temperature controller for controlling the temperature adjusting means, or the refrigerant circuit comprises the isobaric expansion valve for adjusting the amount of refrigerant circulation in the hot gas circuit; the coolant circulating circuit comprises temperature adjusting means for adjusting coolant to a predetermined temperature by mixing coolant cooled in the heat exchanger with coolant returned from the load; and the controlling section comprises the temperature controller for controlling the temperature adjusting means, so that coolant can be precisely controlled at a predetermined temperature by these controlling units.

Also, the refrigerant circuit comprises the electronic expansion valve capable of adjusting the amount of refrigerant circulation in the hot gas circuit; the coolant circulating circuit comprises the heat exchanger for cooling coolant returned from the load to a predetermined temperature; and the controlling section comprises the expansion valve controller for controlling the travel of the electronic expansion valve, so that coolant can be precisely controlled at a predetermined temperature by also these units.

Since the isothermal coolant circulating apparatus does not require the temperature adjusting means in its coolant circulating circuit, the coolant circulating circuit is simply formed.

DESCRIPTION OF THE EMBODIMENTS

Figure 1:
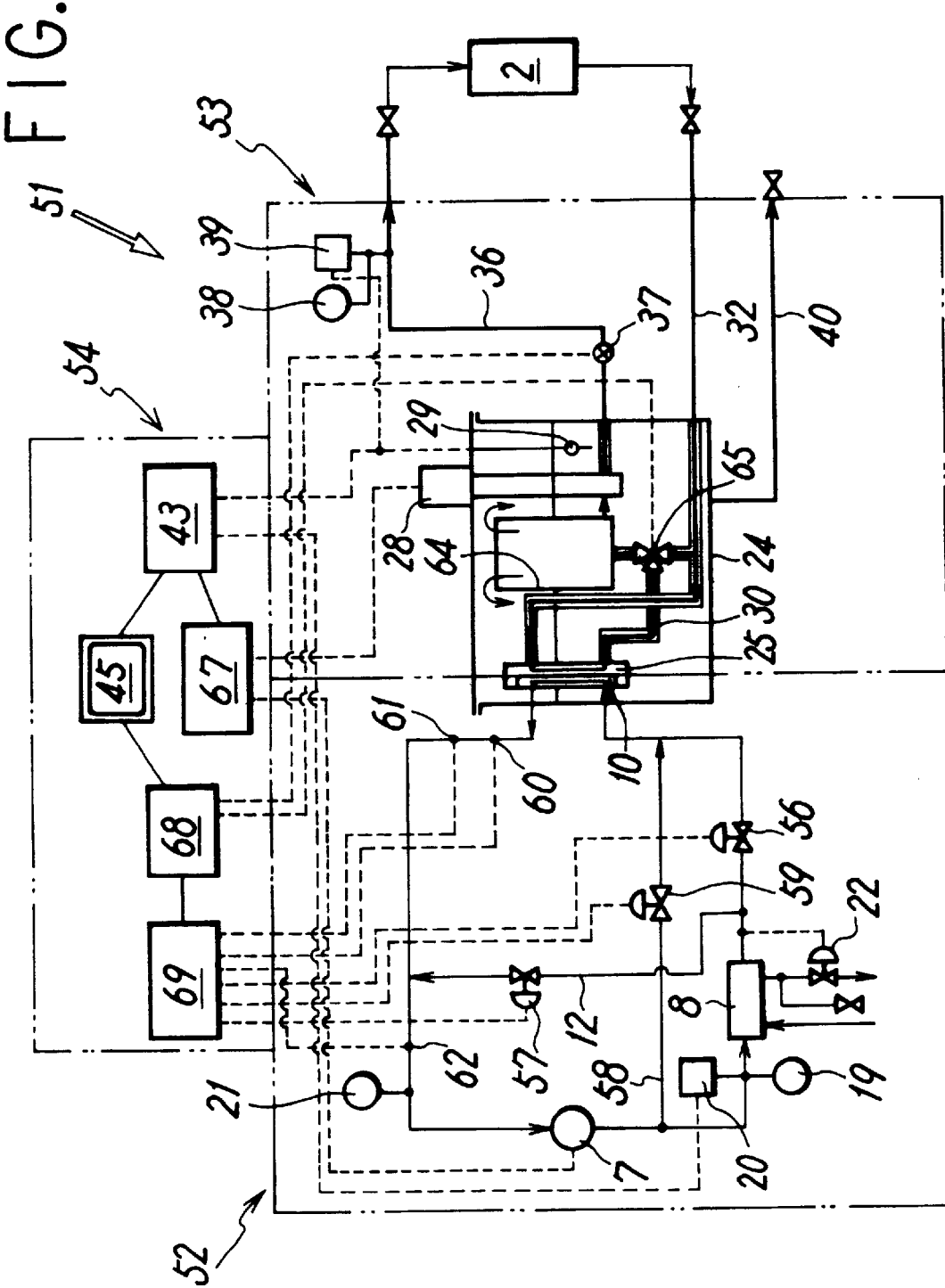
FIG. 1 is a block diagram of a first embodiment.

FIG. 1 shows a first embodiment according to the present invention. This isothermal coolant circulating apparatus 51 comprises a refrigerating circuit section 52, a coolant circuit section 53, and a controlling section 54.

The above-mentioned refrigerating circuit section 52 is formed of a compressor 7 for compressing an appropriate refrigerant to be a high-temperature-and-pressure refrigerant gas, a condenser 8 for cooling and condensing the refrigerant gas to be high-pressure refrigerant liquid (the example shown in the drawing is a water cooled condenser), a pressure-reducing unit for reducing the pressure of the refrigerant liquid to obtain low-temperature-and-pressure refrigerant formed of an electronic expansion valve 56 adjustable in the valve travel, and an evaporator 10 for evaporating low-temperature-and-pressure refrigerant reduced in pressure by the electronic expansion valve 56, these being sequentially connected to each other in series.

The above-mentioned refrigerating circuit section 52 further comprises a return-current circuit 12 for returning refrigerant condensed in the condenser 8 from the path between the condenser 8 and the electronic expansion valve 56 to the inlet side of the compressor 7 when the temperature of refrigerant in the outlet of the evaporator 10 is high, and an expansion valve 57 adjustable in the amount of refrigerant circulation in the return-current circuit 12 (the example shown in the drawing is an electronic expansion valve).

The refrigerating circuit section 52 includes a hot gas circuit 58 for supplying high-temperature-pressure refrigerant gas produced by the compressor 7 directly to the evaporator 10 with an electronic expansion valve 59 disposed in the hot gas circuit 58. Any of these electronic expansion valves 56, 57, and 59 is controlled by an expansion valve controller 69 in the controlling section 54.

In the path between the outlet of the evaporator 10 and the intersection with the return-current circuit 12, a temperature sensor 60 and a pressure sensor 61 for detecting the temperature and the pressure of refrigerant flowing in this path, respectively, are disposed. Furthermore, in the path between the above-mentioned intersection and the inlet of the compressor 7, a temperature sensor 62 is disposed, which detects the temperature of returning refrigerant to the compressor 7 to produce signals. The temperature sensors 60 and 62, and the pressure sensor 61 are formed so as to produce signals to the above-mentioned expansion valve controller 69.

In the path between the compressor 7 and the condenser 8 in the refrigerating circuit section 52, a high-pressure refrigerant pressure gauge 19 for detecting the pressure of high-temperature-pressure refrigerant gas and the above-mentioned high-pressure refrigerant cut-out switch 20 for producing signals when the pressure detected by this pressure gauge increases above a predetermined pressure are disposed. In the inlet side (the returning side) of the compressor 7, a low-pressure refrigerant pressure gauge 21 for detecting the pressure of low-pressure refrigerant gas. In the condenser 8, a water-pressure-control valve 22 for controlling the flow rate of cooling water supplied to the condenser 8 is disposed.

The coolant circuit section 53 comprises a coolant tank 24, an overflow tank 64 disposed within the tank 24, and an electric-motor-operated three-way valve 65 forming temperature adjusting means. The electric-motor-operated three-way valve 65 disposed in the vicinity of the overflow tank 64 mixes the coolant cooled in the heat exchanger 25 and supplied from a pipe 30 with the coolant directly supplied from a coolant returning pipe 32 and supplies the mixture to the overflow tank 64. The coolant at a predetermined temperature in the tank 24 is supplied to the load 2 to cool the load 2 by a pump 28 forming the circulating apparatus.

Figure 5:
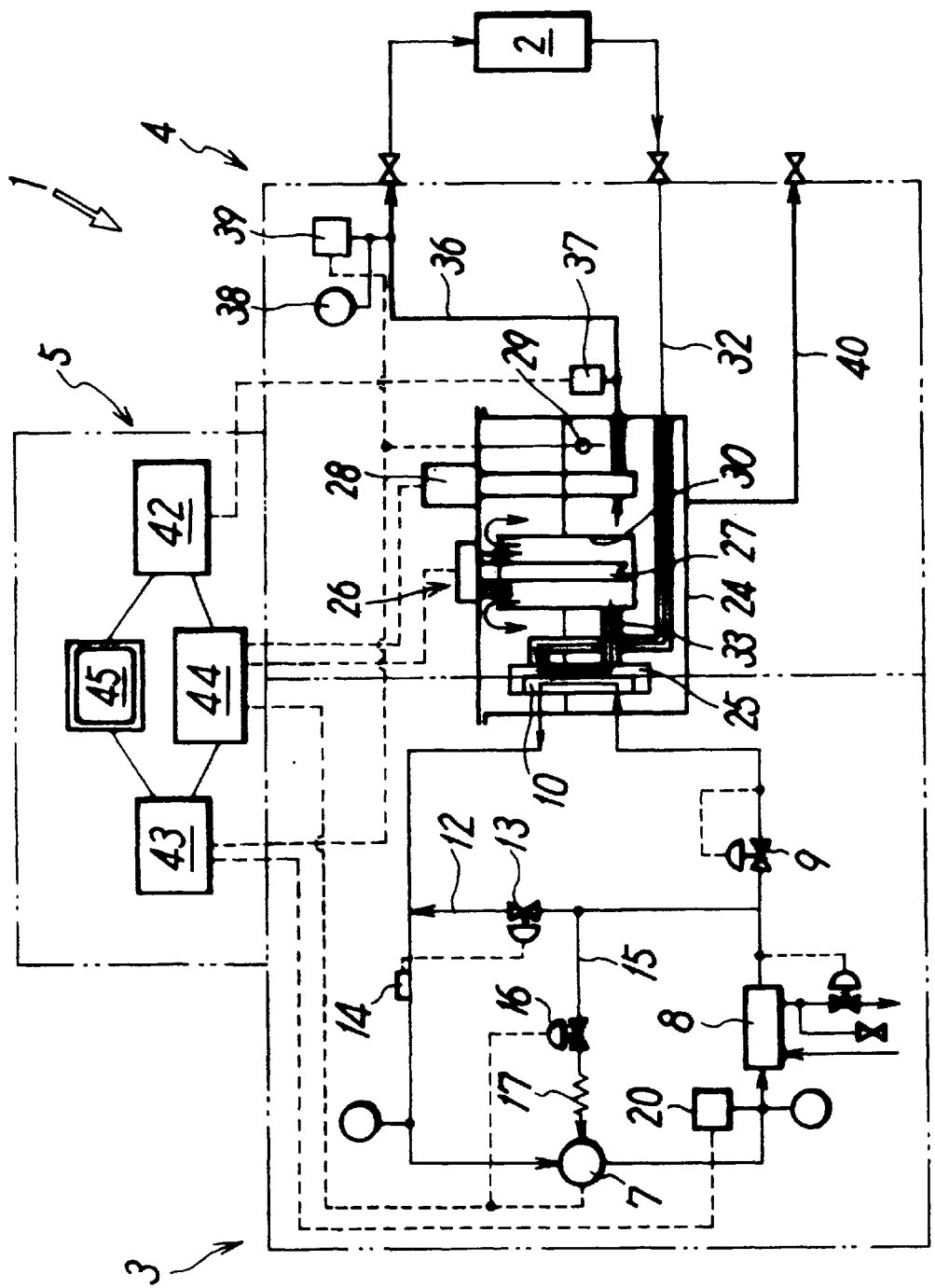
FIG. 5 is a block diagram of a conventional isothermal coolant circulating apparatus.

Since other constituents of the coolant circuit section 53 are identical to those of the coolant circuit section 4 shown in FIG. 5, like reference characters designate like functional portions common to each drawing with the detailed description thereof omitted for brevity.

In addition, the above-mentioned overflow tank 64 may be omitted. In this case, the port of the electric-motor-operated three-way valve 65 communicating with the bottom portion of the overflow tank 64 is to be opened directly to the vicinity of the bottom surface of the tank 24. Since the capacity of the tank 24 can be reduced when the overflow tank 64 is omitted, the amount of expensive coolant (completely fluorinated liquid) is reduced, resulting in enabling moreover to decrease the initial cost and furthermore to miniaturize the isothermal coolant circulating apparatus 51 as well.

The above-mentioned controlling section 54 comprises the "PLC" 43, an electromagnetic contactor/electromagnetic switch 67, a temperature controller 68, the operational display panel 45, and the above-mentioned expansion valve controller 69. The "PLC" 43 is formed so as to produce signals to the electromagnetic contactor/electromagnetic switch 67 in accordance with respective signals from the level switch 29, the low-pressure cut-out switch 39, and the high-pressure refrigerant cut-out switch 20, so that the electromagnetic contactor/electromagnetic switch 67 controls operations of the compressor 7 and the pump 28 by these signals.

The above-mentioned temperature controller 68 is formed so as to produce signals to the expansion valve controller 69 and the display panel 45 by signals from the temperature sensor 37, and also to the electric-motor-operated three-way valve 65 to control the temperature of coolant flowing into the tank 24 at a desired temperature by adjusting the rate of mixing between the coolant cooled in the heat exchanger 25 and the coolant returned from the load 2.

The expansion valve controller 69 produces signals to the electronic expansion valves 56, 57, and 59 to control them, respectively, in accordance with respective signals from the temperature controller 68, the temperature sensors 60 and 62, and the pressure sensor 61, so that the valve travels of the electronic expansion valves 56, 57, and 59 are controlled, respectively.

In the above-described first embodiment, the mixture of the low-temperature refrigerant reduced in pressure by the electronic expansion valve 56 and the hot gas reduced in pressure by the electronic expansion valve 59 is supplied to the evaporator 10 in the refrigerating circuit section 52. The cooling capacity of this refrigerant is adjusted to a desired cooling capacity by the electronic expansion valves 56 and 59 controlled by the signals produced from the expansion valve controller 69.

On the other hand, the coolant returned from the return pipe 32 is cooled while flowing in the heat exchanger 25 by refrigerant flowing in the evaporator 10; then the coolant cooled by the heat exchanger 25 is mixed with the coolant returned from the load 2 by the electric-motor-operated three-way valve 65 to a predetermined temperature; it flows into the tank 24 from the upper opening of the overflow tank 64 or directly; and it is supplied to the load 2 to be circulated by the pump 28.

In these conditions, high-temperature coolant is not excessively cooled by the heat exchanger 25 because the cooling capacity of refrigerant flowing in the evaporator 10 is smaller than that of the only low-temperature refrigerant flowing in the evaporator 10, and the high-temperature coolant is mixed therewith by the electric-motor-operated three-way valve 65, so that the temperature of coolant in the tank 24 can be to a predetermined temperature. Coolant in the tank 24 is adjusted to a predetermined temperature by the controlling of the electronic expansion valves 56 and 59 by the expansion valve controller 69 and the controlling of the electric-motor-operated three-way valve 65 by the temperature controller 68.

In the above-described first embodiment, the heater is not used during adjusting of the coolant to a predetermined temperature, so that the required electric power for operation of the isothermal coolant circulating apparatus 51 can be reduced, resulting in enabling the operating cost of the circulating apparatus 51 and the cost of equipment to be decreased.

Furthermore, since the heater cover and the overflow tank 64 can be omitted, the volume of the tank 24 and the amount of coolant in the tank 24 can be furthermore reduced, resulting in enabling to decrease the initial cost moreover and to miniaturize the entire apparatus as well.

Figure 2:
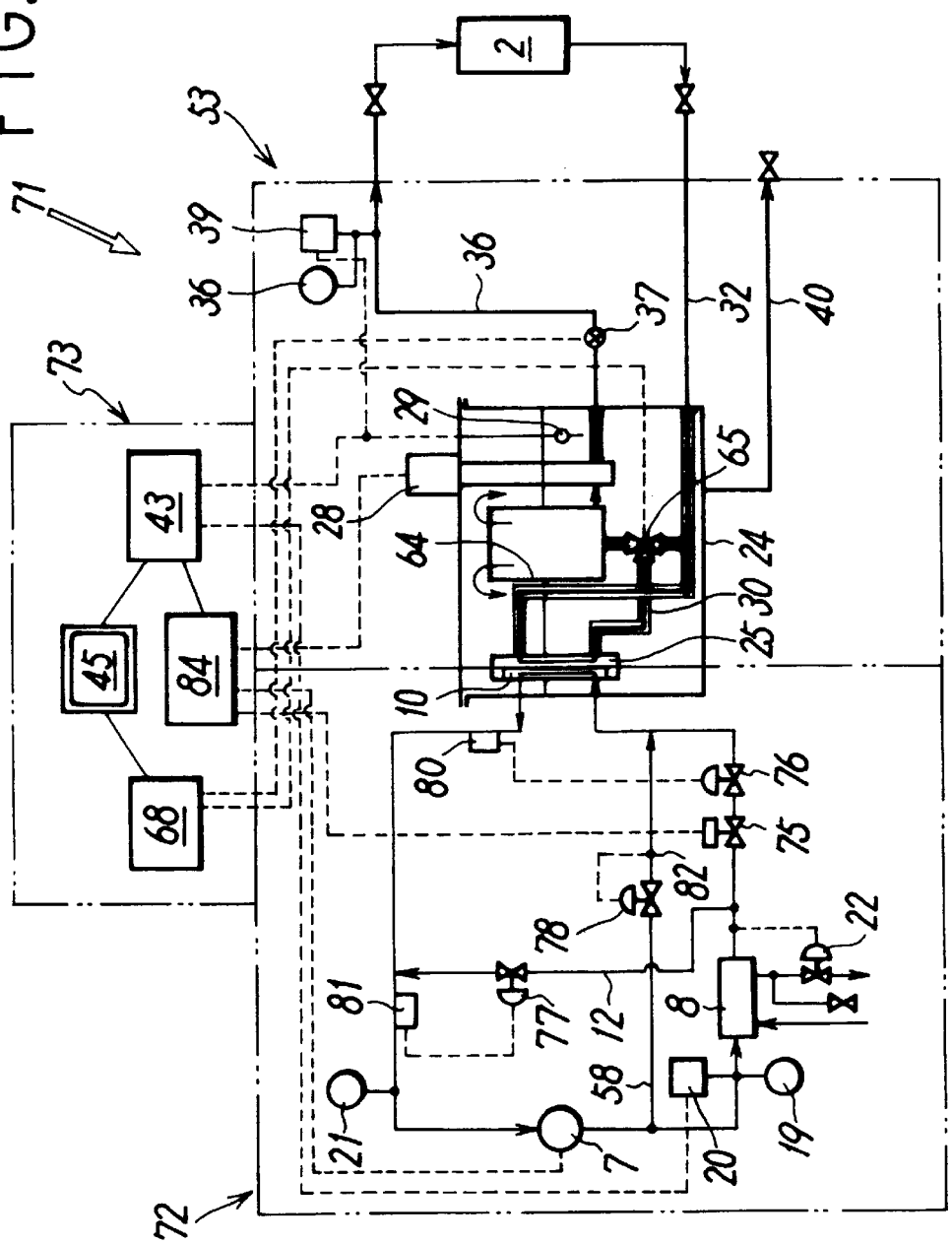
FIG. 2 is a block diagram of a second embodiment.

FIG. 2 shows a second embodiment according to the present invention. This isothermal coolant circulating apparatus 71 comprises a refrigerating circuit section 72, the coolant circuit section 53, and a controlling section 73.

The above-mentioned refrigerating circuit section 72 is formed of the compressor 7 for compressing an appropriate refrigerant to be high-temperature-and-pressure refrigerant gas, the condenser 8 for cooling and condensing the refrigerant gas to be high-pressure refrigerant liquid (the example shown in the drawing is the water cooled condenser), a solenoid operated valve 75, the pressure-reducing unit for reducing the pressure of refrigerant liquid to obtain low-temperature-and-pressure refrigerant (the example shown in the drawing is a thermal expansion valve 76), and the evaporator 10 for evaporating the low-temperature-and-pressure refrigerant reduced in pressure by the thermal expansion valve 76, these being sequentially connected to each other in series.

The above-mentioned refrigerating circuit section 72 further comprises the return-current circuit 12 for returning the refrigerant liquid condensed in the condenser 8 from the path between the condenser 8 and the solenoid operated valve 75 to the inlet side of the compressor 7 when the temperature in the outlet of the evaporator 10 is high, and an expansion valve disposed in the return-current circuit 12 (the example shown in the drawing is a thermal expansion valve 77). The refrigerating circuit section 72 also includes the hot gas circuit 58, just like the first embodiment, and an isobaric expansion valve 78 disposed in the hot gas circuit 58.

The thermal expansion valves 76 and 77 and the isobaric expansion valve 78 are controlled by respective signals of a temperature sensor 80 for detecting the temperature in the outlet side of the evaporator 10, a temperature sensor 81 for detecting the temperature in the inlet side of the compressor 7, and a pressure sensor 82 for detecting the pressure in the output side of the isobaric expansion valve 78. Therefore, the temperature sensors 60 and 62 and the pressure sensor 61 used in the first embodiment are omitted.

The above-mentioned thermal expansion valve 77 is used for decreasing the temperature in the suction side of the compressor 7 by increasing the travel thereof when the temperature therein increases.

The above-mentioned controlling section 73 comprises the "PLC" 43, an electromagnetic contactor/electromagnetic switch 84, the temperature controller 68, and the operational display panel 45. The electromagnetic contactor/electromagnetic switch 84 is formed to control operations of the compressor 7 and the pump 28 and switching of the solenoid operated valve 75 by the respective signals from the "PLC" 43.

Since other constituents of the second embodiment are identical to those of the first embodiment, like reference characters designate like functional portions common to each embodiment omitting the detailed description thereof for brevity.

The isothermal coolant circulating apparatus 71 according to the second embodiment comprises thermal expansion valves 76 and 77, the isobaric expansion valve 78, and the solenoid operated valve 75 in the refrigerating circuit section 72, replacing electronic expansion valves 56, 57, and 59 used in the first embodiment. These expansion valves are controlled by sensors 80 to 82, respectively, while the solenoid operated valve 75 is controlled by the electromagnetic contactor/electromagnetic switch 84, so that the expansion valve controller can be Admitted, resulting in enabling the isothermal coolant circulating apparatus 71 to be simplified and inexpensive.

Figure 3:
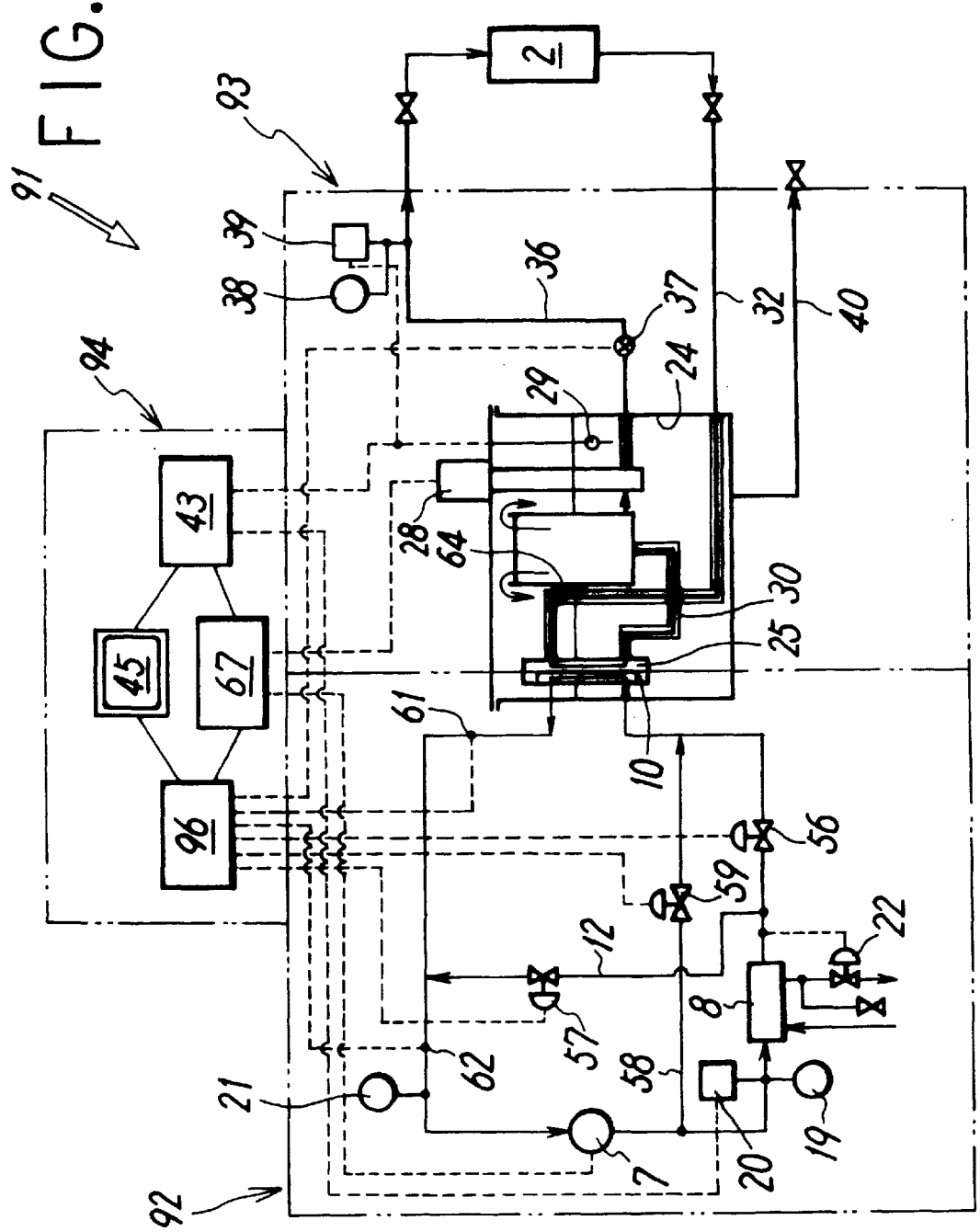
FIG. 3 is a block diagram of a third embodiment.

FIG. 3 shows a third embodiment according to the present invention. This isothermal coolant circulating apparatus 91 comprises a refrigerating circuit section 92, the coolant circuit section 93, and a controlling section 94. The refrigerating circuit section 92 is identically formed to the refrigerating circuit section 52 of the second embodiment except for lacking of the temperature sensor 60.

Therefore, like reference characters designate like functional common portions omitting the detailed description thereof for brevity.

The coolant circuit section 93 is identically formed to the coolant circuit section 53 of the first and second embodiments except that the electric-motor-operated three-way valve 65 is omitted; coolant cooled to a predetermined temperature in the heat exchanger 25 is directly discharged to overflow into the tank 24 from the overflow tank 64 or directly discharged into the tank 24 omitting the overflow tank 64; and the signals of the temperature sensor 37 for detecting the temperature of the coolant supplying to the load 2 are produced to an expansion valve controller 96, which will be described later, in the controlling section 94.

Therefore, like reference characters designate like functional common portions omitting the detailed description thereof for brevity.

The above-mentioned controlling section 94 comprises the "PLC" 43, the electromagnetic contactor/electromagnetic switch 67, the operational display panel 45, and the expansion valve controller 96. The expansion valve controller 96 produces signals to the electronic expansion valves 56, 57, and 59 in accordance with respective signals of the temperature sensors 37 and 62, and the pressure sensor 61 to thereby control the travels of these electronic expansion valves, respectively.

In the third embodiment, since the electric-motor-operated three-way valve can be omitted, the electric power consumption can be furthermore reduced, resulting in achieving energy saving, including operational effects in the first and second embodiments, and since the volume of the tank 24 can be furthermore reduced, the amount of coolant can be moreover reduced as well.

Figure 4:
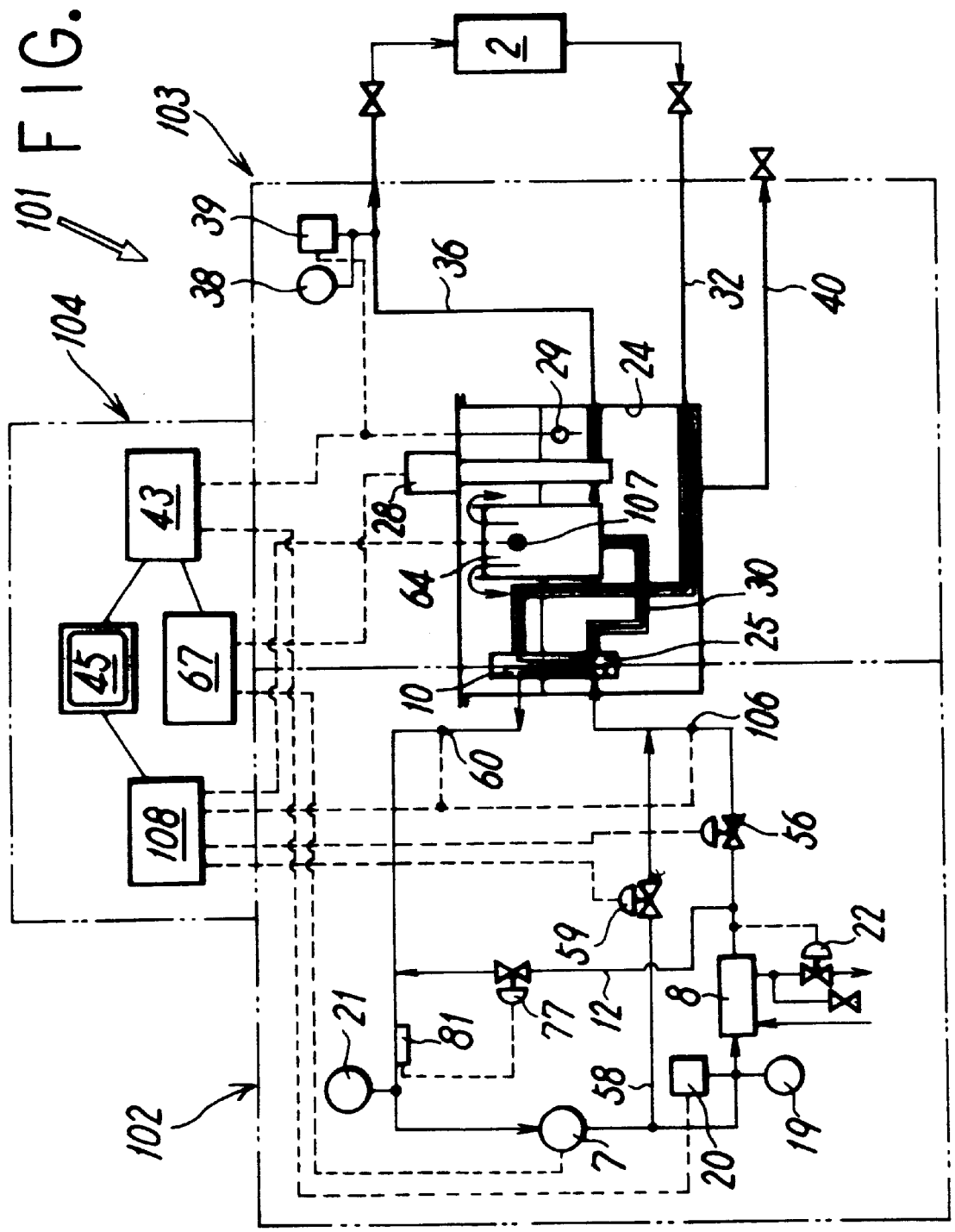
FIG. 4 is a block diagram of a fourth embodiment.

FIG. 4 shows a fourth embodiment according to the present invention. This isothermal coolant circulating apparatus 101 comprises a refrigerating circuit section 102, the coolant circuit section 103, and a controlling section 104.

The refrigerating circuit section 102 comprises a temperature sensor 106 for detecting the temperature of refrigerant flowing in the path between the outlet side of the electronic expansion valve 56 and the intersection with the hot gas circuit 58, the temperature sensor 60 for detecting the temperature of refrigerant gas flowing in the path between the outlet side of the evaporator 10 and the intersection with the return circuit 12, and the thermal expansion valve 77 in the return circuit 12 replacing the electronic expansion valve 57. The pressure sensor 61 is omitted.

The above-mentioned thermal expansion valve 77 is controlled by signals from the temperature sensor 81 for detecting the temperature of the inlet side of the compressor 7 just like in the second embodiment.

Since other constituents of the refrigerating circuit section 102 are identical to those of the refrigerating circuit section 52 in the first embodiment, like reference characters designate like functional common portions omitting the detailed description thereof for brevity.

The above-mentioned coolant circuit section 103 comprises a temperature sensor 107 for detecting the temperature of coolant in the overflow tank 64 to produce signals to an expansion valve controller 108 which will be described later, instead of the temperature sensor 37 in the first and second embodiments for detecting the temperature of coolant in the outlet of the pump 28 to produce signals.

Other constituents of the coolant circuit section 103 are identical to those of the coolant circuit section 93 in the third embodiment. Therefore, like reference characters designate like functional common portions omitting the detailed description thereof for brevity.

The above-mentioned electronic expansion valve 56 controls the difference between respective temperatures of refrigerant detected by the temperature sensors 60 and 106 (the heated rate) to be constant, while the electronic expansion valve 59 is used for adjusting the cooling capacity of refrigerant for supplying to the evaporator 10 to control the temperature of coolant being supplied to the load 2 to be constant just like the above-described embodiments.

The above-mentioned controlling section 104 comprises the "PLC" 43, the electromagnetic contactor/electromagnetic switch 67, the operational display panel 45, and the expansion valve controller 108. The expansion valve controller 108 produces signals to the electronic expansion valves 56 and 59 in accordance with respective signals of the temperature sensors 60, 106, and 107 to thereby control the travels of these electronic expansion valves, respectively.

Since other functions in the fourth embodiment are the same as those in the third embodiment, the description thereof is omitted.

What is claimed is:

1. An isothermal coolant circulating apparatus comprising a coolant circuit section for cooling coolant returned from a load to a predetermined temperature to supply the coolant to the load, a refrigerating circuit section for cooling the coolant, and a controlling section for controlling the temperature of coolant for supplying to the load, wherein said refrigerating circuit section comprises a hot gas circuit for adjusting the cooling capacity of refrigerant for supplying to an evaporator by mixing low-temperature refrigerant for supplying to the evaporator with a portion of high-temperature refrigerant discharged from a compressor; and an isobaric expansion valve for adjusting the circulating rate of refrigerant in the hot gas circuit, wherein said coolant circuit section comprises a coolant tank; a heat exchanger for cooling coolant returned from the load by means of the evaporator; temperature-adjusting means for adjusting coolant to supply to the load to a predetermined temperature by coolant cooled in the heat exchanger and coolant returned from the load; and circulating means for supplying coolant cooled to a predetermined temperature to the load to circulate the coolant, and wherein said controlling section comprises a temperature controller for controlling the temperature adjusting means.

2. An isothermal coolant circulating apparatus according to claim 1, wherein said refrigerating circuit section further comprises an electronic expansion valve for replacing-the isobaric expansion valve, and wherein said controlling section further comprises an expansion valve controller for controlling the travel of the electronic expansion valve.

* * * * *